(12) United States Patent
Francis

(10) Patent No.: US 7,636,674 B2
(45) Date of Patent: Dec. 22, 2009

(54) TICKET DISTRIBUTION SYSTEM

(76) Inventor: Mitchell J. Francis, 12145 Summit Ct., Beverly Hills, CA (US) 90210

( * ) Notice: Subject to any disclaimer, the term of this patent is extended or adjusted under 35 U.S.C. 154(b) by 1598 days.

(21) Appl. No.: 10/327,611

(22) Filed: Dec. 24, 2002

(65) Prior Publication Data

US 2003/0177022 A1  Sep. 18, 2003

Related U.S. Application Data

(60) Provisional application No. 60/342,096, filed on Dec. 26, 2001.

(51) Int. Cl.
*G06Q 30/00* (2006.01)
(52) U.S. Cl. .............................. 705/26; 705/28; 705/22; 705/14
(58) Field of Classification Search ................... 705/28, 705/22, 14, 26
See application file for complete search history.

(56) References Cited

U.S. PATENT DOCUMENTS

| | | | | |
|---|---|---|---|---|
| 5,408,417 A | * | 4/1995 | Wilder ........................... | 705/5 |
| 5,459,306 A | * | 10/1995 | Stein et al. ................... | 235/383 |
| 5,797,126 A | * | 8/1998 | Helbling et al. ................ | 705/5 |
| 6,477,503 B1 | * | 11/2002 | Mankes ......................... | 705/5 |
| 6,496,809 B1 | | 12/2002 | Nakfoor | |
| 6,507,823 B1 | * | 1/2003 | Nel .............................. | 705/26 |
| 2002/0082969 A1 | | 6/2002 | O'Keeffe et al. | |

* cited by examiner

*Primary Examiner*—Janice A. Mooneyham
*Assistant Examiner*—Michael J Fisher
(74) *Attorney, Agent, or Firm*—Welsh & Flaxman LLC

(57) ABSTRACT

A system is provided for facilitating the distribution of unused theater tickets. The system includes a central distribution processor to which theater patrons are provided access for determining the availability of theater tickets and purchasing available theater tickets at a discounted rate. The system further includes a plurality of remote ticket offices of distinct theaters linked to the central distribution processor, the remote ticket offices including interface software compatible with the central distribution processor for facilitating the uploading of relevant ticket information to the central distribution processor. The interface software further provides a user interface through which the plurality of remote ticket offices selectively enter available theater ticket information which is subsequently uploaded to the central distribution processor for access and purchase by theater patrons.

15 Claims, 2 Drawing Sheets

TICKET DISTRIBUTION SYSTEM

CROSS-REFERENCE TO RELATED APPLICATIONS

This U.S. Patent Application is based upon U.S. Provisional Patent Application Ser. No. 60/342,096, filed Dec. 26, 2001, and entitled "Ticket Distribution System".

BACKGROUND OF THE INVENTION

1. Field of the Invention

The invention relates to a system providing consumers with discounts for theater tickets.

2. Description of the Prior Art

Many businesses operate in a "use it or lose it" environment in which services are placed in the public domain and are forever wasted if a consumer does not take advantage of the service being offered. For example, theatrical performances are generally scheduled for a specific time and go on whether the house is full or empty. Any unused and/or unsold seats represent a total loss. The loss associated with the unused or unsold seats may not be recouped, since the cost of the production is substantially the same whether that seat is or is not used.

Similarly, the costs associated with the operation of a restaurant are substantially the same whether every table is filled for the entire evening or not. That is, the restaurant owner is responsible for paying the staff, utilities and other expenses associated with the operation of a restaurant whether the restaurant is full or not. In fact, food costs associated with a specific meal are minimal when the overall operating costs of a restaurant are considered. Use of these tables, even when food is discounted, would result in a benefit to the restaurant when compared to total non-use commonly encountered during low volume times. For example, profit is made on the discounted meal, wait staff receives additional tips and beverage expenses add to the overall gross income of the restaurant.

As such, both restaurants and theaters attempt various marketing techniques to ensure that their facilities are optimally utilized. Despite these efforts, they are not always successful in optimally making use of their facilities. The present invention provides a system aiding both restaurants and theaters in respectively marketing unused reservations and tickets.

SUMMARY OF THE INVENTION

It is, therefore, an object of the present invention to provide a system for facilitating the distribution of unused theater tickets. The system includes a central distribution processor to which theater patrons are provided access for determining the availability of theater tickets and purchasing available theater tickets at a discounted rate. The system further includes a plurality of remote ticket offices of distinct theaters linked to the central distribution processor, the remote ticket offices including interface software compatible with the central distribution processor for facilitating the uploading of relevant ticket information to the central distribution processor. The interface software further provides a user interface through which the plurality of remote ticket offices selectively enter available theater ticket information which is subsequently uploaded to the central distribution processor for access and purchase by theater patrons.

It is also an object of the present invention to provide a system wherein the theater patron pays a ticketing fee to an operator of the system.

It is another object of the present invention to provide a system wherein the distinct theaters pay the operator a fee based upon the sale of discounted tickets.

It is still another object of the present invention to provide a system wherein the user interface includes a seating chart display through which a remote ticket office employee enters unused ticket information.

It is a further object of the present invention to provide a system including a ticket information and sales site at which theater patrons may access the central distribution processor for purchasing tickets.

It also an object of the present invention to provide a method for distributing potentially unused tickets. The method is achieved in the following manner: establishing a central distribution processor which stores information concerning the availability of tickets which may be purchased at a discounted price; installing interface software compatible with the central distribution processor at a plurality of remote ticket offices, the interface software facilitating the uploading of relevant ticket information to the central distribution processor, entering available ticket information at the remote ticket office via a user interface associated with the interface software, the user interface permitting the plurality of remote ticket offices to selectively enter available ticket information for uploading to the central distribution processor, uploading the available ticket information to the central distribution processor, and providing patrons with access to the central distribution processor for determining the availability of tickets and purchasing available tickets.

It is further an object of the present invention to provide a system for facilitating the distribution of unused tickets. The system includes a central distribution processor to which patrons are provided access for determining the availability of tickets and purchasing available tickets at a discounted rate. The system further includes a plurality of remote ticket offices of distinct venues linked to the central distribution processor, the remote ticket offices including interface software compatible with the central distribution processor for facilitating the uploading of relevant ticket information to the central distribution processor. The interface software further provides a user interface through which the plurality of remote ticket offices selectively enter available ticket information which is subsequently uploaded to the central distribution processor for access and purchase by patrons.

Other objects and advantages of the present invention will become apparent from the following detailed description when viewed in conjunction with the accompanying drawings, which set forth certain embodiments of the invention.

DESCRIPTION OF THE PREFERRED EMBODIMENTS

The detailed embodiments of the present invention are disclosed herein. It should be understood, however, that the disclosed embodiments are merely exemplary of the invention, which may be embodied in various forms. Therefore, the details disclosed herein are not to be interpreted as limited, but merely as the basis for the claims and as a basis for teaching one skilled in the art how to make and/or use the invention.

Figure 1:
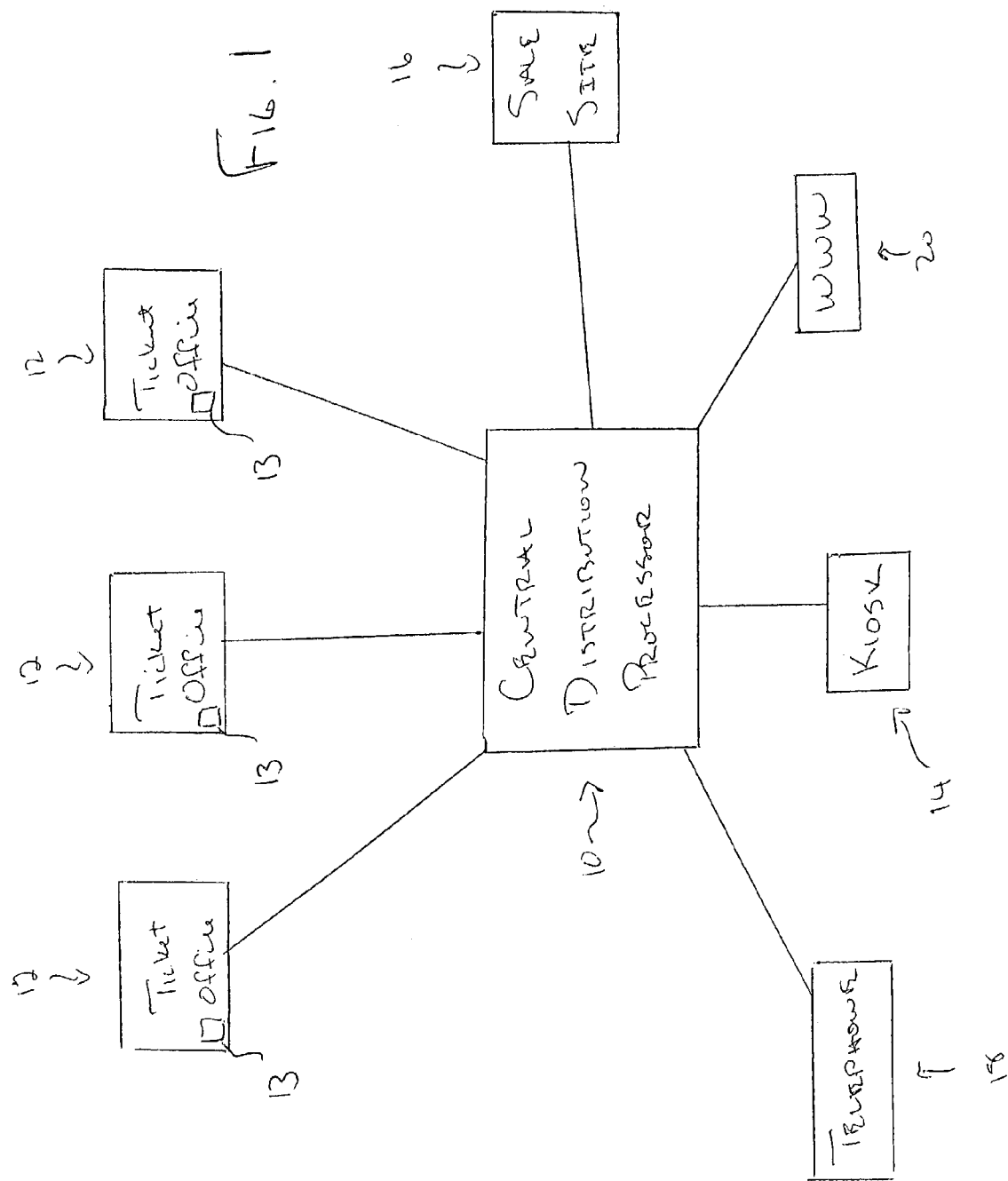
FIG. 1 is a schematic of the present system.

With reference to FIG. 1, a system for facilitating the distribution of unsold theater tickets is disclosed. The system interconnects a central distribution processor 10 with one or a plurality of remote ticket offices 12 making unused, and/or unsold, tickets available to theater patrons at a discounted rate (for example, half price or 2 for 1).

More specifically, the system includes a central distribution processor 10 which monitors, maintains and provides access to information regarding the availability of discounted theater tickets. In accordance with a preferred embodiment of the present invention, theater patrons are provided access to the information maintained in the central distribution process 10 via a kiosk 14, or other patron interface, at which patrons may browse available tickets and purchase seats to those shows they wish to see. The system further includes a plurality of remote ticket offices 12 of distinct theaters (or other venues as discussed below) linked to the central distribution processor 10. The remote ticket offices 12 include interface software 13 compatible with the central distribution processor 10 for facilitating the uploading of relevant ticket information to the central distribution processor 10. The interface software further provides a user interface through which the plurality of remote ticket offices 12 selectively enter available theater ticket information which is subsequently uploaded to the central distribution processor 10 for access and purchase by theater patrons.

In accordance with a preferred embodiment of the present invention, the central distribution processor 10 is maintained at, or in association with, a ticket information and sales site 16. The ticket information and sales site 16 provides theater patrons with a convenient location at which they may gather ticket information and/or purchase available theater tickets. The ticket information and sales site 16 is further provided with a plurality of computer terminals, operated by employees of the company operating the present system. It is further contemplated that theater patrons may obtain ticket and sales information via telephone 18 or a global communication network 20 (e.g., WWW). Although the communication systems described above are generally wire based, communication may be achieved via wireless systems as may be developed in the future.

The ticket information and sales site 16 is further provided with an information board upon which available tickets, and associated prices, are listed for convenient review by theater patrons in the vicinity of the ticket information and sales site 16. It is contemplated that the information board will take the form of a conventional electronic overhead display or video monitors.

Based upon a preferred set up for the ticket information and sales site 16, a theater patron is provided ready access to ascertain available unused tickets and purchase the same from a system employee. Ticket information is retrieved by either personally consulting with an employee operating a computer terminal directly linked to the central distribution processor 10 or merely reviewing the information presented on the information board positioned for easy access by patrons in the vicinity of the ticket information and sales site.

In an effort to provide patrons with information regarding the various shows for which tickets are available, the ticket information and sales site 16 is further equipped with video monitors showing excerpts of the various shows for which tickets are available. Written literature regarding the various shows is also made available to patrons requiring information before deciding upon which show to see.

As mentioned above, the central distribution processor 10 is linked to a plurality of remote ticket offices 12 of distinct theaters. Facilitating communication between the various theaters participating in the present system and the central distribution processor 10 is an interface software 13 compatible with the central distribution processor 10. The interface software 13 is loaded at each of the remote ticket offices 12 and permits these ticket offices to conveniently and reliably transmit unused ticket information to the central distribution processor 10 such that the unused tickets are immediately made available to theater patrons taking advantage of the present system.

In accordance with the preferred embodiment of the present invention, the interface software 13 directs employees of the remote ticket office 12 on entering unused ticket information onto the computer system of the ticket office 12 in such a way that the interface software 13 loaded on the computer system of the ticket office 12 formats the unused ticket information for use by the central distribution processor 10. The ticket office computer system, through the use of the interface software 13, then transmits the formatted ticket information to the central distribution processor 10 such that it may be readily used by the central distribution processor 10. The interface software 13 includes an interface screen 22 provided with a seating diagram of the specific theater. Associated with the seating diagram is pricing information for each show.

Figure 2:
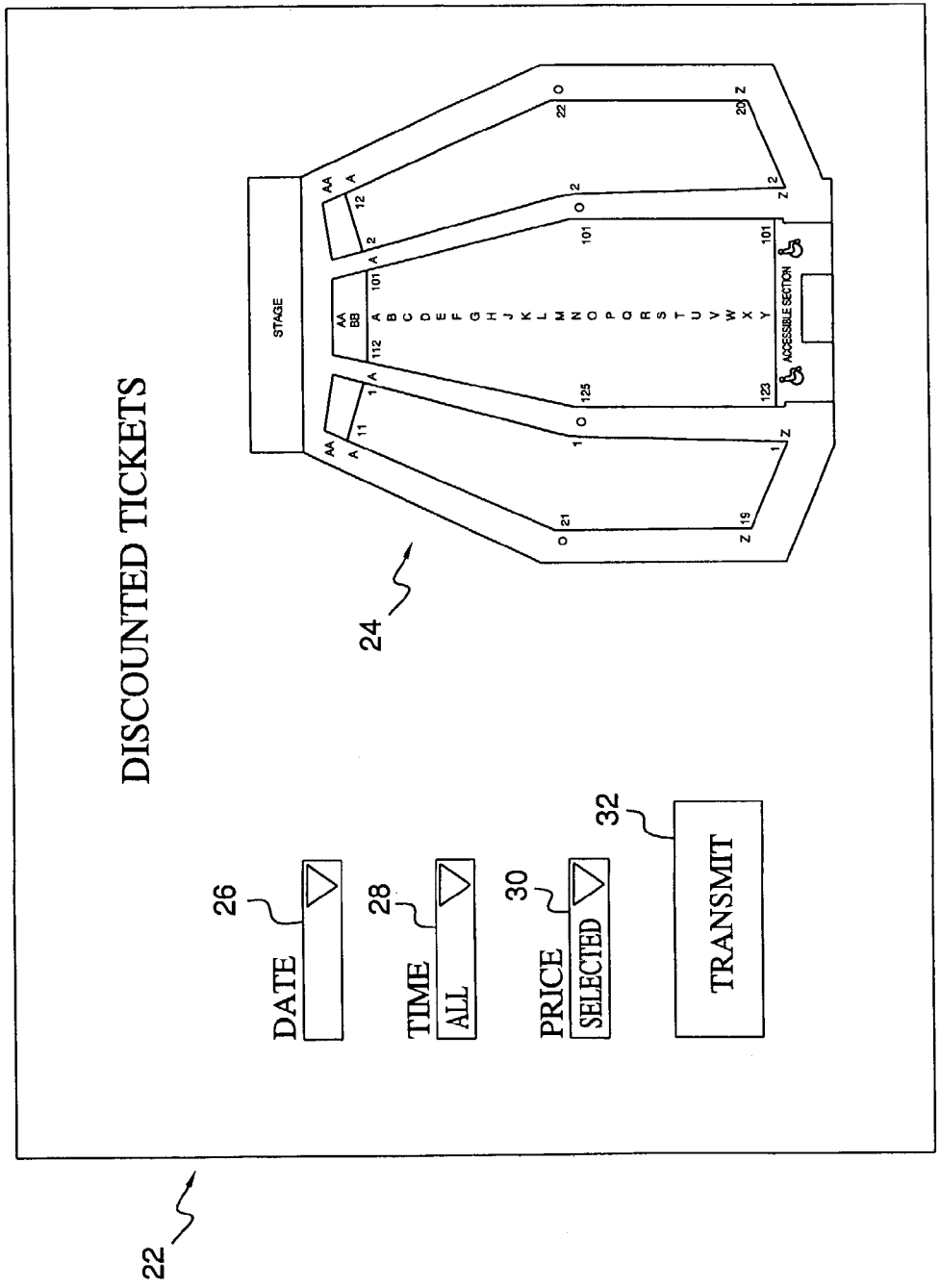
FIG. 2 is an exemplary interface screen in accordance with the present invention.

With a reference to FIG. 2, an interface screen 22 is disclosed which may be used in accordance with the present invention. The interface screen 22 includes an interactive seating chart 24 which may be actuated via a mouse to designate specific seats for sale. Pre-sold seats will either be not shown in the seating chart or colored differently from unsold seats so as to permit operators to readily determine those seats which may be selected in accordance with the present invention. The interface screen 22 also includes drop down menus for indicating the date of the event 26, the time of the event 28 and the price at which the seats should be sold 30. Once all selections are made, the selected information is transmitted to the central distribution processor by clicking on the transmit button 32.

In this way, the remote ticket office employee need only pick a specific show for which he or she wishes to designate unused tickets to be made available via the present system and click upon the specific unused seats shown on the seating diagram to designate those unused tickets the theater wishes to make available through the present system. Once the theater ticket employee selects the designated unused seats, the interface software 13 combines the selected seats with ticket cost information. The information is then formatted and transmitted to the central distribution processor 10. While a preferred embodiment utilizes a computer network for transmitting information to the central distribution processor, it is contemplated that the information may be transmitted in other ways, for example, via facsimile, or other electronic communication mechanisms.

It is contemplated that the unused ticket information will be made available to theater patrons on a daily basis with the unused ticket information being release on a daily basis at a predetermined time before a show. However, since remote ticket offices have control over when to release tickets via the interface software, the remote ticket offices may choose to release tickets throughout the day if they find such a distribution technique enhances overall sales of tickets.

It should be understood that the present system links a plurality of distinct, unrelated theaters through the application of the interface software described above. The present system, therefore, does not require that the distinct theaters operate in a similar manner or that the distinct theaters form a type of affiliation. Rather, the use of the present interface software in conjunction with the central distribution processor allows these distinct theaters to operate independently, while permitting the theaters to readily distribute unused tickets when it is determined they may go to waste via sales through the theater's own ticket office.

For example, the remote ticket office may decide to release 50 unused tickets at 2 p.m. and later determine to release 50 more unused tickets at 4 p.m. Decision making regarding when and how many tickets to release is enhanced by providing the interface software with functionality permitting the remote ticket office to monitor sales of their released tickets at the ticket information and sales site. Specifically, the remote ticket office is provided with limited access to the central distribution database, permitting retrieval of information concerning ticket sales via the present system. As such, if the remote ticket office finds that the 50 tickets released at 2 p.m. are going quickly, they may decide to release additional tickets to the central distribution processor, if such tickets are still available. The present system allows these remote ticket offices to conveniently, reliably and quickly release tickets to meet theater patrons' needs and ensure that the optimum number of tickets are sold for each and every show.

From a business perspective, it is contemplated that both the patron and remote ticket office will pay the operator of the present system a fee for the use of the present system. Specifically, it is contemplated that the theater patrons will pay a ticketing fee commonly used in conjunction with conventional ticket distribution systems and the remote ticket office is responsible for paying the system operators a fee based upon the value of tickets distributed via the present system.

It is further contemplated that the present invention may similarly be applied in the distribution of premium tickets for which patrons will be expected to pay a price above the established ticket cost. Such a system would be implemented in much the same manner as the discounted distribution system described above. For example, the contemplated system includes a central distribution processor which monitors, maintains and provides access to information regarding the availability of premium theater tickets. The premium tickets for sale by the present system are released via the remote ticket office and this information is forwarded to the central distribution processor in the manner described above with regard to the release of discounted tickets. As discussed above, the remote ticket offices of distinct theaters linked to the central distribution processor include interface software compatible with the central distribution processor for facilitating the uploading of relevant ticket information to the central distribution processor. The interface software further provides a user interface through which the plurality of remote ticket offices selectively enter available theater ticket information which is subsequently uploaded to the central distribution processor for access and purchase by theater patrons.

The theater patrons are ultimately provided access to the premium ticket information maintained in the central distribution process via a kiosk, or other patron interface, at which patrons may browse available tickets and purchase seats to those shows they wish to see.

While a preferred embodiment of the present invention is directed to the distribution of theater tickets in the manner described above, those skilled in the art will certainly appreciate that the principles of the present invention may be applied to other ticket distribution situations without departing from the spirit of the present invention. For example, the principles of the present invention may be applied to the distribution of sporting event tickets, movie tickets, concert tickets, etc. while still remaining within the spirit of the present invention.

While the preferred embodiments have been shown and described, it will be understood that there is no intent to limit the invention by such disclosure, but rather, is intended to cover all modifications and alternate constructions falling within the spirit and scope of the invention as defined in the appended claims.

The invention claimed is:

1. A system for facilitating the distribution of unused theater tickets, comprising:
   a central distribution processor to which theater patrons are provided access for determining the availability of theater tickets and purchasing available theater tickets at a discounted rate;
   a plurality of remote ticket offices of distinct theaters linked to the central distribution processor, the remote ticket offices including interface software compatible with the central distribution processor for facilitating the uploading of relevant ticket information to the central distribution processor, wherein the interface software facilitating the uploading of relevant ticket information is under the control of the remote ticket offices; and
   wherein the interface software further provides a user interface through which the plurality of remote ticket offices selectively enter available theater ticket information which is subsequently uploaded under the control of the remote ticket offices to the central distribution processor for access and purchase by theater patrons.

2. The system according to claim 1, wherein the theater patron pays a ticketing fee to an operator of the system.

3. The system according to claim 1, wherein the distinct theaters pay the operator a fee based upon the sale of discounted tickets.

4. The system according to claim 1, wherein the user interface includes a seating chart display through which a remote ticket office employee enters unused ticket information.

5. The system according to claim 1, further including a ticket information and sales site at which theater patrons may access the central distribution processor for purchasing tickets.

6. A method for distributing potentially unused tickets, comprising the following steps:
   establishing a central distribution processor which stores information concerning the availability of tickets which may be purchased at a discounted price;
   installing interface software compatible with the central distribution processor at a plurality of remote ticket offices, the interface software facilitating the uploading of relevant ticket information to the central distribution processor;
   entering available ticket information at the remote ticket office via a user interface associated with the interface software, the user interface permitting the plurality of remote ticket offices to selectively enter available ticket information for uploading to the central distribution processor;
   uploading the available ticket information to the central distribution processor; and
   providing theater patrons with access to the central distribution processor for determining the availability of tickets and purchasing available tickets.

7. The method according to claim 6, further including the step of charging the patron a ticketing fee when a ticket is purchased.

8. The method according to claim 6, further including the step of charging distinct venues a fee based upon the sale of discounted tickets.

9. The method according to claim 6, wherein the user interface includes a seating chart display through which a remote ticket office employee enters unused ticket information.

10. The method according to claim 6, wherein patrons are provided access to the central distribution processor at a ticket information and sales site.

11. A system for facilitating the distribution of unused tickets, comprising:

a central distribution processor to which patrons are provided access for determining the availability of tickets and purchasing available tickets at a discounted rate;

a plurality of remote ticket offices of distinct venues linked to the central distribution processor, the remote ticket offices including interface software compatible with the central distribution processor for facilitating the uploading of relevant ticket information to the central distribution processor, wherein the interface software facilitating the uploading of relevant ticket information is under the control of the remote ticket offices; and wherein the interface software further provides a user interface through which the plurality of remote ticket offices selectively enter available ticket information which is subsequently uploaded under the control of the remote ticket offices to the central distribution processor for access and purchase by patrons.

12. The system according to claim 11, wherein the patron pays a ticketing fee to an operator of the system.

13. The system according to claim 11, wherein the distinct venues pay the operator a fee based upon the sale of discounted tickets.

14. The system according to claim 11, wherein the user interface includes a seating chart display through which a remote ticket office employee enters unused ticket information.

15. The system according to claim 11, further including a ticket information and sales site at which patrons may access the central distribution processor for purchasing tickets.

* * * * *